United States Patent
Keinonen et al.

(10) Patent No.: US 6,595,027 B1
(45) Date of Patent: Jul. 22, 2003

(54) METHOD AND APPARATUS FOR SUPPORTING THE MIDDLE SECTION OF A GLASS PANEL TO BE BENT IN A MOLD

(75) Inventors: Pentti Keinonen, Tampere (FI); Heikki Koivisto, Tampere (FI)

(73) Assignee: Tamglass LTD Oy, Tampere (FI)

( * ) Notice: Subject to any disclaimer, the term of this patent is extended or adjusted under 35 U.S.C. 154(b) by 333 days.

(21) Appl. No.: 09/686,824

(22) Filed: Oct. 12, 2000

(30) Foreign Application Priority Data

Nov. 2, 1999 (FI) .............................................. 19992364

(51) Int. Cl.$^7$ ........................................... C03B 23/025
(52) U.S. Cl. ....................... 65/29.19; 65/162; 65/273; 65/290
(58) Field of Search .................... 65/29.11, 29.19, 65/162, 273, 289, 290, 291, DIG. 13

(56) References Cited

U.S. PATENT DOCUMENTS

| | | | |
|---|---|---|---|
| 833,436 A | * 10/1906 | Borland et al. ................ | 65/289 |
| 3,023,542 A | 3/1962 | Babcock ....................... | 65/289 |
| 3,166,397 A | * 1/1965 | Hohmann et al. ............. | 65/268 |
| 3,281,227 A | * 10/1966 | Leflet, Jr. et al. .............. | 65/62 |
| 3,433,616 A | * 3/1969 | Wampler et al. .............. | 65/289 |
| 5,302,176 A | * 4/1994 | Shibuya et al. ............... | 65/106 |
| 5,306,324 A | * 4/1994 | Vehmas et al. ................ | 65/104 |

FOREIGN PATENT DOCUMENTS

| | | |
|---|---|---|
| EP | 0 162 264 | 7/1991 |
| EP | 0 697 375 | 2/1996 |

* cited by examiner

*Primary Examiner*—Sean Vincent
(74) *Attorney, Agent, or Firm*—Burns, Doane, Swecker & Mathis, LLP

(57) ABSTRACT

The invention relates to a method and apparatus for supporting the middle section of a glass panel to be bent in a mold. During a preheating process of a glass panel, its middle section is supported by middle support elements carried along with a mold carriage. At the start of a bending process, the middle support is released by pushing bearing rods through the bottom of the mold carriage. The middle support for the glass panel is lowered upon the bearing rods gradually under the control of glass panel thermometry. A controlled hoisting and lowering of the bearing rods is performed by a hoisting and lowering mechanism present in a carriage elevator. The invention makes it possible to implement a middle support also in an automatically operating serial furnace.

16 Claims, 4 Drawing Sheets

METHOD AND APPARATUS FOR SUPPORTING THE MIDDLE SECTION OF A GLASS PANEL TO BE BENT IN A MOLD

FIELD OF THE INVENTION

The present invention relates to a method for supporting the middle section of a glass panel to be bent in a mould, in which method the middle section of a glass panel placed on a mould is supported during loading and a preheating process and the support is released at the start of a bending process for allowing the glass panel to deflect so as to be supported by the mould over its middle section as well.

The invention relates also to an apparatus for supporting the middle section of a glass panel to be bent in a mould, said apparatus comprising support elements for the middle section of a glass panel, which are secured to a mould or a mould carriage, as well as elements for releasing the middle support at the start of a bending process.

BACKGROUND OF THE INVENTION

A problem encountered in the process of bending large glasses, such as windshields for buses or trucks, is that the unsupported span or bearing distance for the middle section of a glass placed on a mould becomes excessively long, whereby the glass may break up upon bending under its own weight during a loading process in a cold condition or in a preheating process prior to reaching a bending temperature. It is prior known to provide a mould with various middle support systems for avoiding the break-up of a glass. However, the prior known middle support systems are such that the implementation thereof is impossible in an automated serial furnace.

It is an object of the invention to provide a method and apparatus for supporting the middle section of a glass panel to be bent in a mould in such a way that the middle support can be implemented also in an automated serial furnace.

A second object of the invention is to provide a method and apparatus, whereby the middle support can be controllably lowered during a bending process.

A third object of the invention is to provide a method and apparatus, whereby the two foregoing objects can be accomplished without having to construct the carriages and moulds with complicated actuators, which are replaced with an actuator common to all moulds and set up in a bending station.

These objects are achieved by means of a method of the invention.

These objects are also achieved by means of an apparatus of the invention.

BRIEF DESCRIPTION OF THE DRAWING FIGURES

The invention will now be described in more detail by way of an exemplary embodiment with reference to the accompanying drawings, in which FIG. 1 shows an apparatus of the invention in a section taken along a line I—I in FIG. 2, i.e. with the apparatus in a standby condition at the start of a bending process;

DETAILED DESCRIPTION OF THE INVENTION

Figure 2:
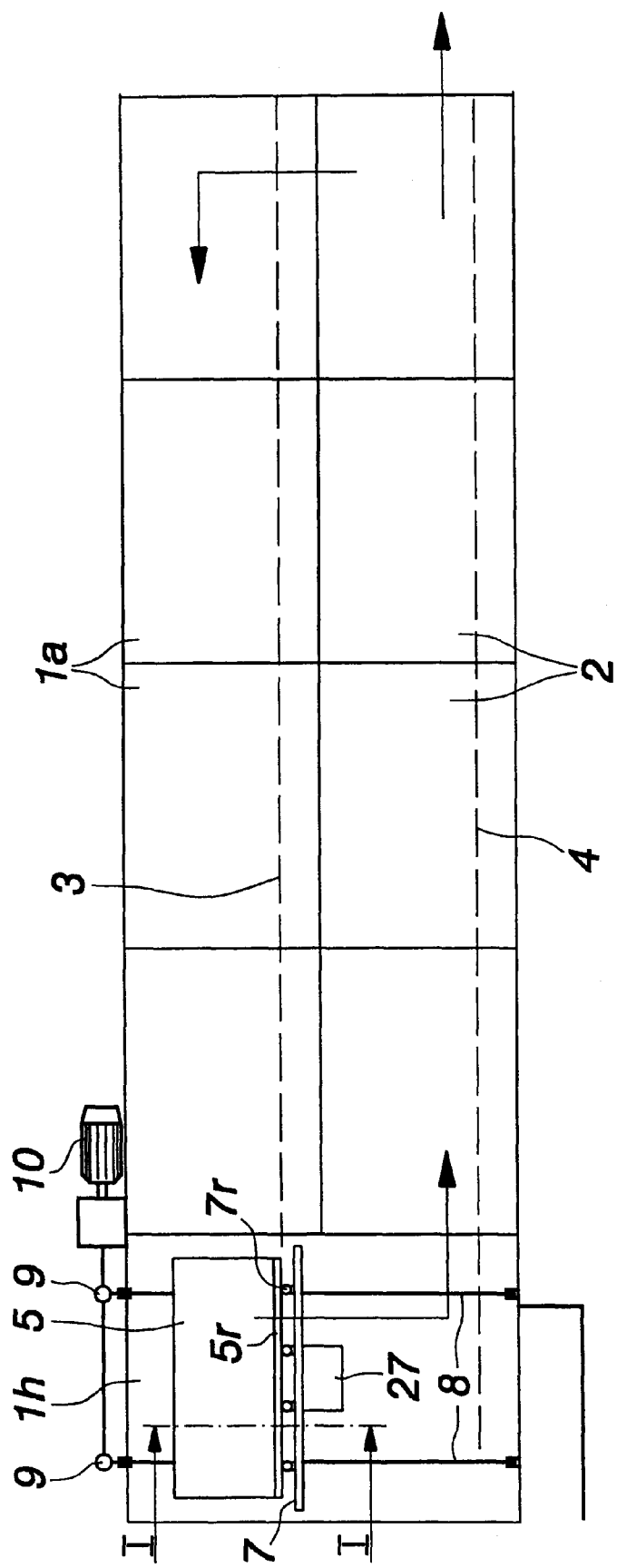
FIG. 2 shows in a schematic side view an automated serial furnace for use in a bending process for glass panels and for applying a method and apparatus of the invention.

The serial furnace shown in FIG. 2 comprises a number of sequential preheating stations 1$a$ and therebelow a number of sequential cooling stations 2. Moulds, along with glass panels to be bent, are placed in mould carriages 5, which are closed e.g. in the bottom and sides but open in the top, such that the glass panels can be heated by means of heating resistances (not shown) mounted on the ceiling of the preheating stations 1$a$ and an actual bending station 1$h$. The mould carriage 5 may vary in many ways regarding its design. The carriage may be e.g. one with an open bottom, whereby the heat possessed by glass panels presently cooling on the lower track of a serial furnace can be exploited for heating glass panels present on the upper track. The mould carriage 5 is only depicted in the bending station 1$h$ but, as the furnace is in operation, the successive mould carriages 5 are advanced intermittently in the circulation direction indicated by arrows both on an upper track 3 and a lower track 4.

Figure 1:
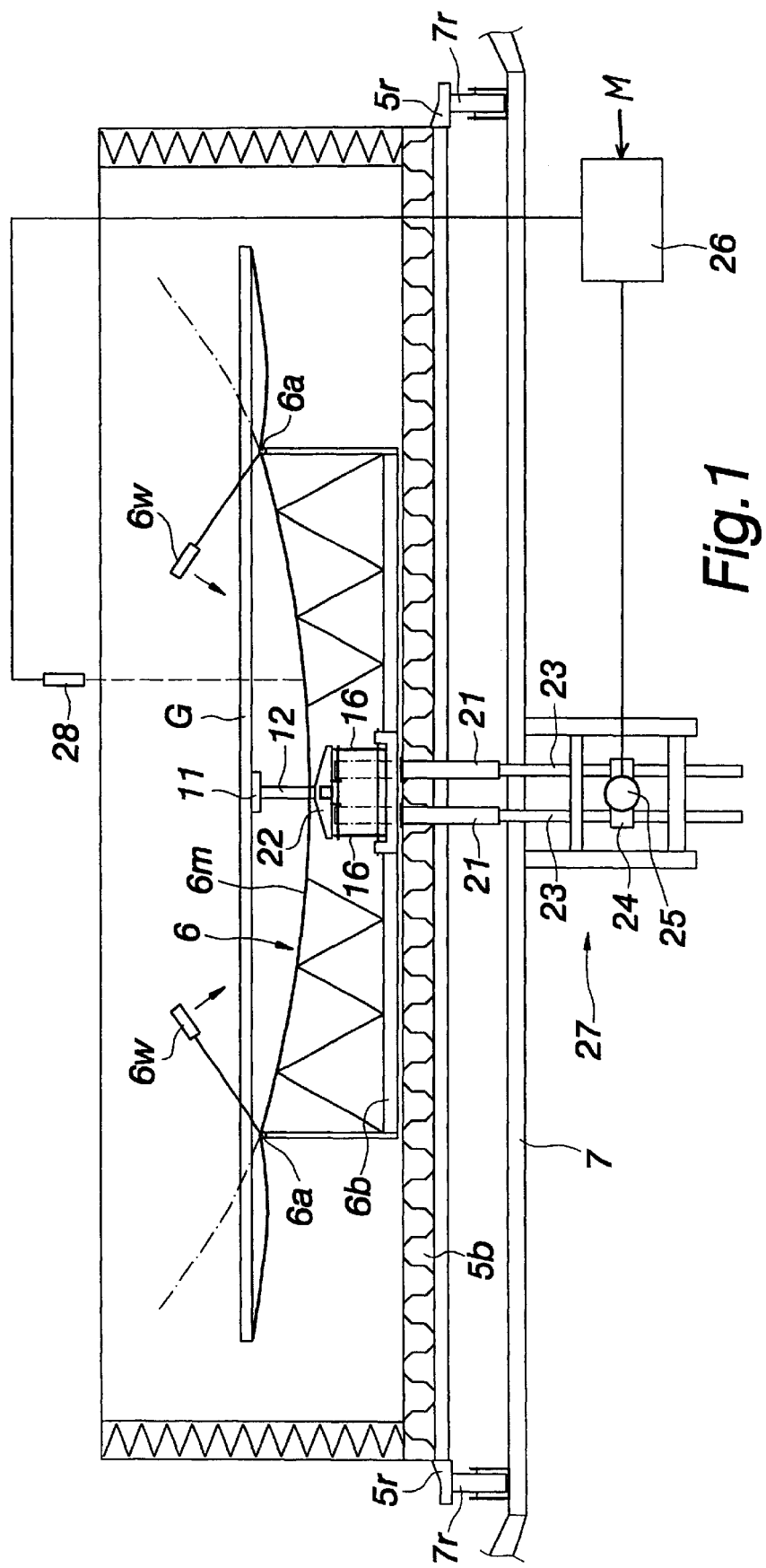

As shown in more detail in FIG. 1, alongside the mould carriage 5 are carriage rails 5$r$, upon which the carriages travel on top of rollers present in the tracks 3 and 4. The bending station 1$h$ is provided with a carriage elevator 7, having its wheel system 7$r$ constitute extensions for the tracks 3 and 4 as the elevator 7 is in its top or bottom position, respectively. The elevator 7 is hoisted and lowered e.g. by means of upright helical shafts 8 rotatable by a motor 10 through the intermediary of herringbone gears 9. The structural design and maneuvering mechanism of the elevator 7 are of secondary significance as far as the invention is concerned and can be implemented in a variety of ways.

FIG. 1 illustrates a mould 6 present in the mould carriage 5, comprising a circular mould ring 6$m$, which constitutes an actual form face and includes end sections pivotable by means of hinges 6$a$. Through the action of weights 6$w$ the end sections are pivotable to the position shown by dash-and-dot lines as soon as the glass panel becomes sufficiently heated and softened to enable its gravitational bending to a contour determined by the mould ring. There is such a long distance between the articulations 6$a$ that a glass panel G could break up at its middle section without a middle support.

Figure 3:
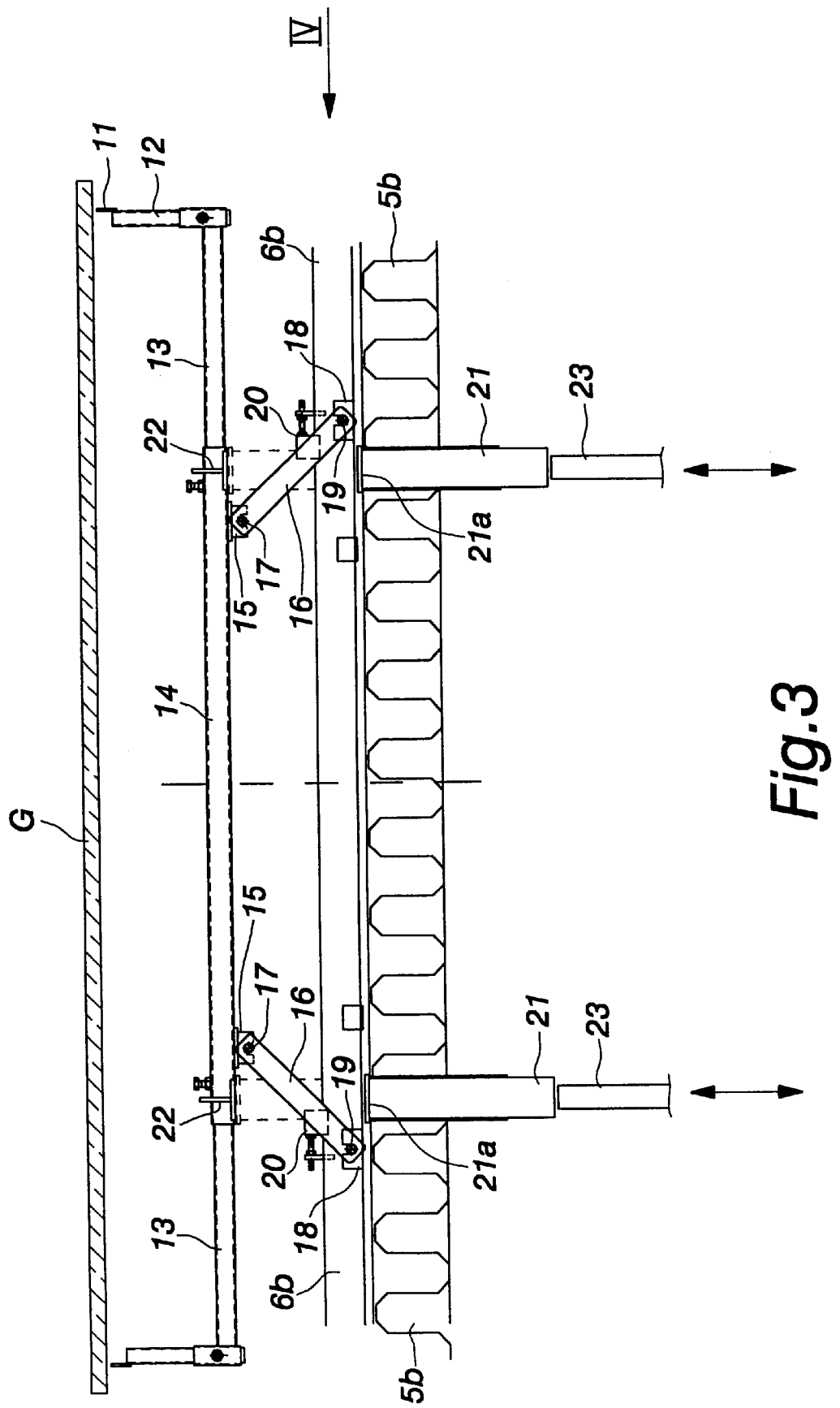
FIG. 3 shows a middle support apparatus of the invention in a more detailed design consistent with a section taken along a line III—III in FIG. 4.
Figure 4:
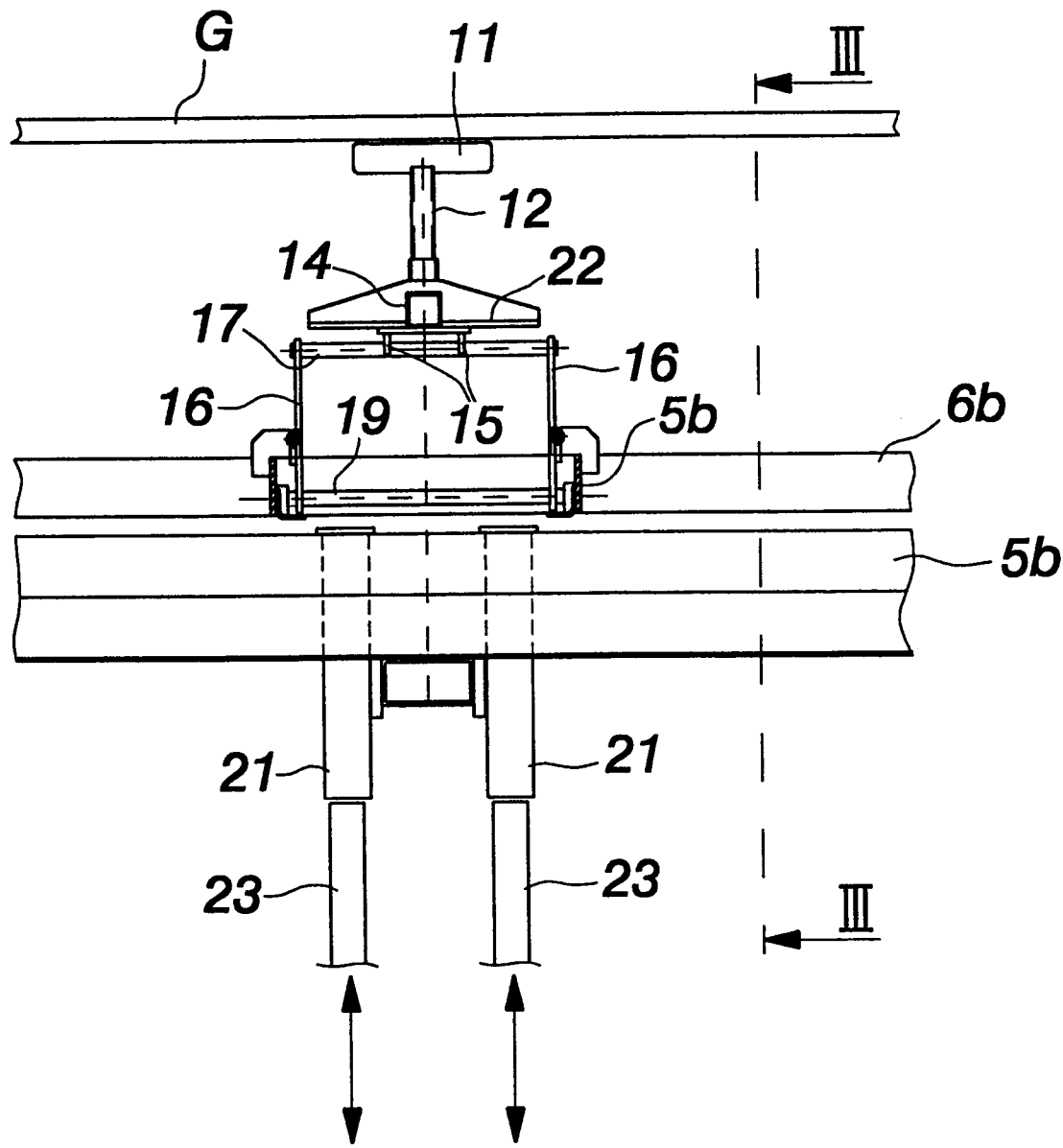
FIG. 4 shows the apparatus of FIG. 3 as seen from a direction IV (consistent with the viewing direction of FIG. 1).

Middle support elements 11–19, movable along with the mould carriage and in this case secured to the mould 6, are depicted more closely in FIGS. 3 and 4. These support elements include horizontal bearing pads 11, located adjacent to the long edges of a glass panel G and mounted on the ends of vertical rods 12. The vertical rods 12 are connected to the ends of horizontal frame tubes 13. The frame tubes 13 are telescopically insertable within an intermediate frame tube 14, whereby the distance between the bearing pads 11 is adjustable to match various widths of the glass panel G. The frame tube 14 is provided on its bottom side with lugs 15, which have downward open slots for taking up axles 17 present at the top ends of braces 16. The braces 16 are provided at the bottom ends thereof with axles 19, which are taken up in lugs 18 secured to a bottom mould framework 5$b$. The braces 16 retain the supporting position thereof as a result of the weight of the frame element 13, 14, but are released from the supporting position thereof upon slightly raising the frame element 13, 14, whereby the braces 16 swivel by themselves gravitationally to a substantially horizontal position.

In order to release the braces 16 and take up a middle support, there are bearing rods 21 adapted to be driven through apertures present in the mould carriage bottom 5b. In view of driving the bearing rods 21, the carriage elevator 7 shown in FIG. 1 is accompanied by a hoisting and lowering mechanism 27, from which rise lifting bars 23 which coincide with the axial line of the bearing rods 21 as the mould carriage 5 is parked in the carriage elevator 7. The frame tube 14 is fitted with crosswise response elements 22, which are contacted by the top ends of the bearing rods 21 as said bearing rods 21 are pushed to the top position thereof by means of the lifting bars 23. The glass panel G can be bent slightly upwards in order to allow the braces 16 to fall and the middle support to be released upon the bearing rods 21 and the lifting bars 23. If the invention is applied in a single furnace or a tunnel furnace, there is no need for the carriage elevator 7. In this case, the hoisting and lowering mechanism 27 is set on the floor of a bending station in such a way that it remains underneath the bottom of a carriage arriving in the bending station.

When a given type of glass panel is bent for the first time, the controlled lowering of a middle support is carried out with manual control, such that a bending station window is used for monitoring the glass bending (e.g. swiveling of the end sections of mould 6), and a motor 25 for the hoisting and lowering mechanism 27 is controlled with manual input data M for a control unit 26. During the bending process, the control unit 26 stores in its memory the glass temperature readings, which match various degrees of bending and are obtained from a pyrometer 28.

Hereinafter, the controlled lowering of a middle support can be performed under the control of glass panel thermometry. Therefor, the pyrometer 28 (or some other measuring sensor, such as a thermoelement) keeps measuring the temperature of a glass panel, on the basis of which the control unit 26 drives the motor 25 for the hoisting and lowering mechanism 27, which uses a transmission device 24 for bringing downward the middle support carried by the bars 23. The engagement between transmission device 24 and bar 23 may be based on a screw spindle or a gear rack.

The invention does not necessarily require thermometrically controlled lowering of a middle support, as the invention is also capable of achieving its objectives by performing the controlled lowering of a middle support merely under manual control M. However, the thermometry-based control offers the benefit of relieving the operator of this control duty after teaching the apparatus how to perform the temperature dependent lowering.

The lifting bars has a diameter which is smaller than that of the bearing rods 21, the lifting bars 23 being able to fit within bushings guiding the bearing rods 21 without exact tolerances. The bearing rods 21 are preferably heavy-duty solid metal shafts, hence descending under their own weight to a bottom position with a plate cap 21a resting against the mould carriage bottom 5b and plugging the bottom hole at the same time. In the illustrated case, the number of bearing rods 21 and, respectively, lifting bars 23 is four each, but the apparatus functions faultlessly also with two rods and bars (thus, the pair of rods 21 and bars 23 shown in FIG. 4 is replaced with just a single rod 21 and a single bar 23).

After the cooled glass is demoulded, the middle support can be reset in a working position by lifting the frame 13, 14 manually up to being supported by the braces 16. Adjustable brackets 20 take up the braces 16 in a correct angular position for readily guiding the same into the slots of the lugs 15. In addition, the brackets 20 support the braces 16 and hence the entire bearing mechanism in a lateral direction.

A particular advantage offered by the middle support of the invention is that those components carried along with the moulds 6 and the mould carriages 5, a plurality of which are needed for each furnace, are simple, lightweight, and attractive in price, while the hoisting and lowering mechanism 27 serving the automated operation of the apparatus is arranged in a bending station, in the case of a serial furnace in conjunction with the carriage elevator 7, whereby just a single hoisting and lowering mechanism 27 per furnace is required. In the case of a single or tunnel furnace, when there is no carriage elevator, the floor of a bending station can be provided with a suitable recess or well for receiving the hoisting and lowering mechanism 27. The mechanism 27 has its hoisting action limited to lifting only the bearing rods 21 and to releasing the middle support from its clamping. Other than that, its function is a controlled lowering of the middle support.

What is claimed is:

1. A method for supporting the middle section of a glass panel to be bent in a mould, comprising supporting a middle section of a glass panel placed on a mould during loading and a preheating process to provide middle support by way of middle support elements carried on a mould carriage, releasing the support at a start of a bending process for allowing the glass panel to deflect so as to be supported by the mould over its middle section, the middle support being released by moving bearing rods through a bottom of the mould carriage with the middle support for the glass panel being lowered upon said bearing rods gradually as a temperature of the glass panel rises, the bearing rods being moved by a hoisting and lowering mechanism.

2. A method as set forth in claim 1, wherein the middle support is lowered under the control of glass panel thermometry.

3. An apparatus for supporting a middle section of a glass panel to be bent in a mould, said apparatus comprising support elements secured to a mould or mould carriage to provide middle support of the middle section of the glass panels, middle support release elements for releasing the middle support at the start of a bending process, the middle support release elements including vertical bearing rods adapted to be axially movable in apertures present in a floor of the mould carriage and a hoisting and lowering mechanism arranged in a bending station for lifting the bearing rods to a position releasing and taking up the middle support, the hoisting and lowering mechanism being adapted to controllably lower the middle support as temperature of the glass panel rises.

4. An apparatus as set forth in claim 3, wherein the hoisting and lowering mechanism is secured to a carriage element present in a serial furnace.

5. An apparatus as set forth in claim 3, wherein the support elements include braces which retain a supporting position as a result of a weight of a frame element of the support elements, the braces being adapted to be released from the supporting position upon lifting the frame element so that the braces pivot gravitationally to a substantially horizontal position.

6. An apparatus as set forth in claim 3, comprising a control unit for effecting a manual control of the hoisting and lowering mechanism.

7. An apparatus as set forth in claim 6, wherein the control unit is provided with a pyrometer measuring the temperature of the glass panel and the control unit is adapted to store in a memory temperature readings for the glass panel as well as respective middle support descent readings obtained by the manual control.

8. An apparatus as set forth in claim 3, wherein temperature readings of the glass panel are used to control the hoisting and lowering mechanism for a controlled lowering of the middle support.

9. An apparatus as set forth in claim 3, wherein the hoisting and lowering mechanism includes vertical lifting bars coaxial with the bearing rods as the mould carriage is parked in a bending station or in a carriage elevator present in the bending station.

10. An apparatus as set forth in claim 9, wherein the lifting bars have a diameter which is smaller than the diameter of the bearing rods.

11. An apparatus as set forth in claim 9, wherein the bearing rods are heavy-duty solid metal shafts, which descend under their own weight to a bottom position as the lifting bars descend, and that in the bottom position of the bearing rods a plate cap at a top of the bearing rods rests against the mould carriage bottom and plugs a hole in a bottom of the mould carriage.

12. A method for supporting a middle section of a glass panel to be bent in a mould comprising supporting a middle section of a glass panel placed on a mould during loading and a preheating process by way of middle support elements carried on a mould carriage to provide middle support of the glass panel, releasing the middle support provided by the middle support elements at a start of a bending process to allow the glass panel to deflect and be supported by the mould over its middle section, the middle support being released by upwardly moving bearing rods carried by the mould carriage from a bottom of the mould carriage with the middle support for the glass panel being taken up by way of said bearing rods as a temperature of the glass panel rises, the bearing rods being upwardly moved by a hoisting and lowering mechanism located in a bending station.

13. A method as set forth in claim 12, wherein the middle support elements include braces and a frame element, the braces retaining a supporting position supporting the middle section of the glass panel as a result of a weight of the frame element, the upward movement of the bearing rods moving the frame element upwardly to release the braces from the supporting position, with the braces pivoting gravitationally to a substantially horizontal position.

14. A method as set forth in claim 12, including effecting a manual control of the hoisting and lowering mechanism.

15. A method as set forth in claim 12, including measuring the temperature of the glass panel to obtain temperature readings of the glass panel and obtaining middle support descent readings, and storing the temperature readings as well as the middle support descent readings in memory.

16. A method as set forth in claim 12, including measuring the temperature of the glass panel to obtain temperature readings of the glass panel, and using the temperature readings to control the hoisting and lowering mechanism to achieve a controlled lowering of the middle support.

* * * * *